United States Patent
Trolese et al.

(10) Patent No.: US 9,167,667 B2
(45) Date of Patent: Oct. 20, 2015

(54) REMOVABLE NIGHT LIGHT

(71) Applicant: Pass & Seymour, Inc., Syracuse, NY (US)

(72) Inventors: Lorenzo Trolese, Camillus, NY (US); Richard M. Rohmer, Jordan, NY (US); Lam Chung Fai, Kowloon (CN); Leung Kwok Chung, North Point (CN); Joshua Haines, Marcellus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 406 days.

(21) Appl. No.: 13/835,076

(22) Filed: Mar. 15, 2013

(65) Prior Publication Data
US 2014/0139119 A1   May 22, 2014

Related U.S. Application Data

(63) Continuation-in-part of application No. 13/680,675, filed on Nov. 19, 2012.

(51) Int. Cl.
  *H05B 37/02*   (2006.01)
  *F21S 8/02*    (2006.01)
  *H02G 3/12*    (2006.01)

(52) U.S. Cl.
  CPC ............. *H05B 37/0218* (2013.01); *F21S 8/024* (2013.01); *H02G 3/12* (2013.01)

(58) Field of Classification Search
  CPC ...... F21S 8/024; F21S 8/035; H05B 37/0218; H02G 3/12; F21V 23/06
  See application file for complete search history.

(56) References Cited

U.S. PATENT DOCUMENTS

| | | | |
|---|---|---|---|
| 6,805,469 B1 * | 10/2004 | Barton | 362/365 |
| 6,989,489 B1 | 1/2006 | Savicki, Jr. | |
| 7,009,111 B1 * | 3/2006 | Rintz | 174/66 |
| 7,188,235 B2 | 3/2007 | Wang et al. | |
| 7,213,932 B1 | 5/2007 | Savicki, Jr. | |
| 7,285,721 B1 | 10/2007 | Savicki, Jr. | |
| 7,360,912 B1 | 4/2008 | Savicki, Jr. | |
| 7,543,941 B2 | 6/2009 | Holder et al. | |
| 7,758,234 B1 | 7/2010 | Savicki, Jr. et al. | |
| 7,990,252 B2 | 8/2011 | Barton | |
| 7,999,485 B1 | 8/2011 | Richards et al. | |
| 8,629,617 B2 | 1/2014 | Richards et al. | |

OTHER PUBLICATIONS

Legrand Vela, Pull Out Emergency Torch With Automatic Switch-On Device, p. 1, 1999.
Bticino, Living International, pp. 1-50, 1998.

* cited by examiner

*Primary Examiner* — Thomas M Sember
(74) *Attorney, Agent, or Firm* — Daniel P. Malley; Bond Schoeneck & King, PLLC

(57) ABSTRACT

The present invention is directed to an electrical device that includes a lighting circuit is disposed in the second housing and coupled to the voltage output terminals. The lighting circuit includes a control circuit coupled to a plurality of first light elements and at least one second lighting element. The plurality of first light elements is configured to provide a relatively wide illumination beam when energized by the control circuit in a first operational state, and the at least one second lighting element being configured to provide a relatively narrow illumination beam when energized by the control circuit in a second operational state. The control circuit is configured such that the first operational state and second operational state do not simultaneously occur.

33 Claims, 10 Drawing Sheets

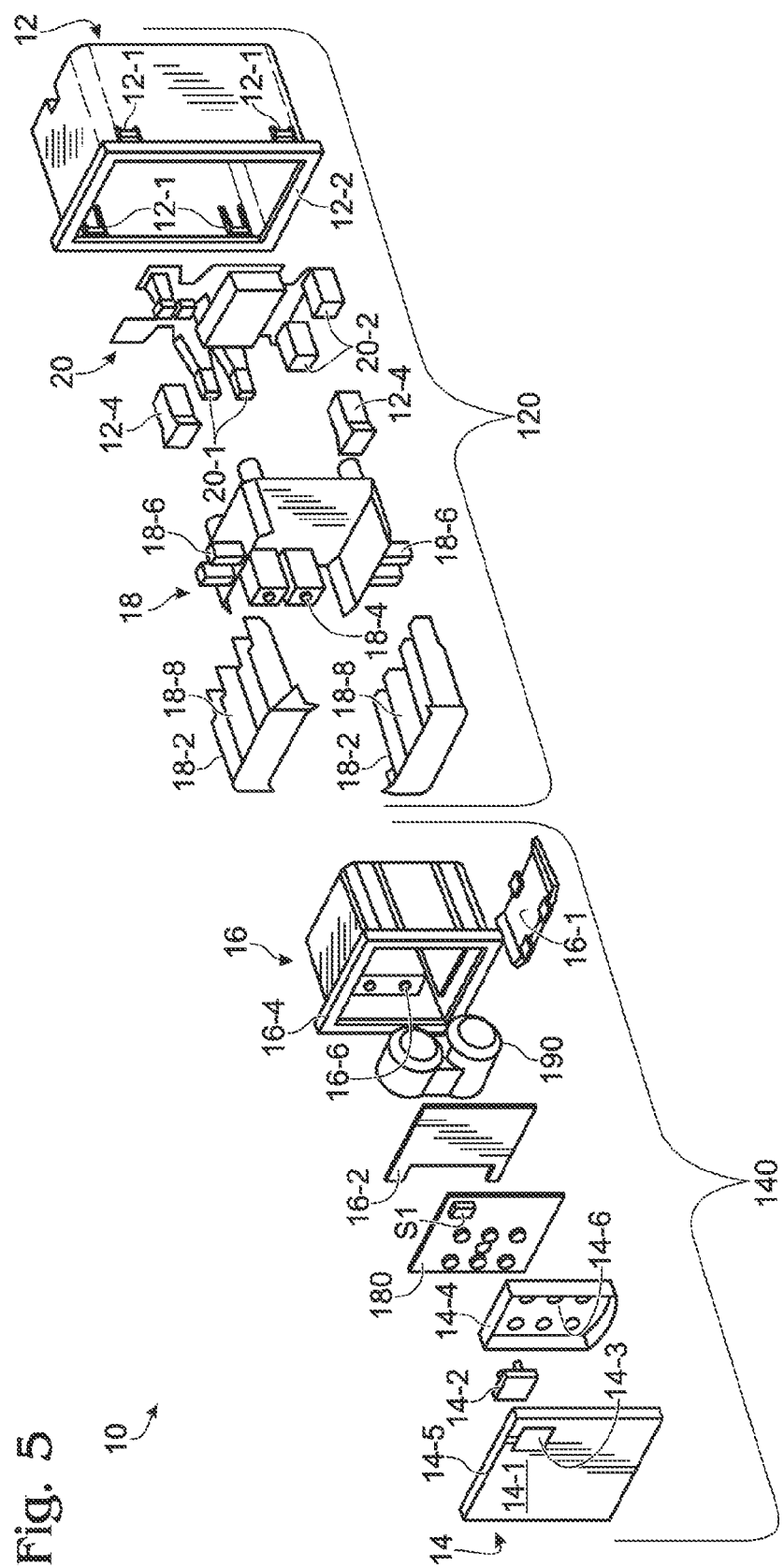

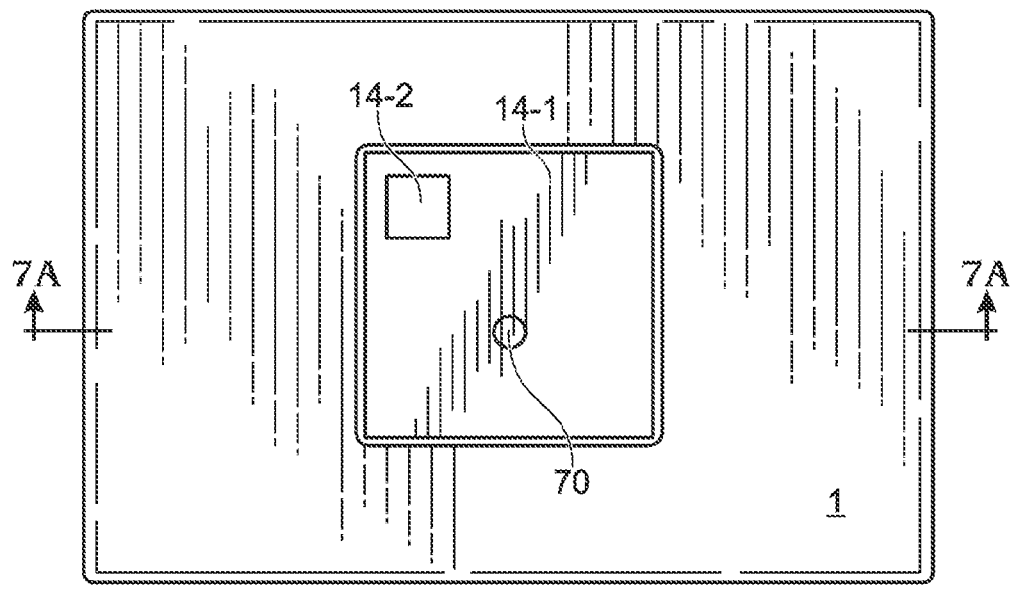
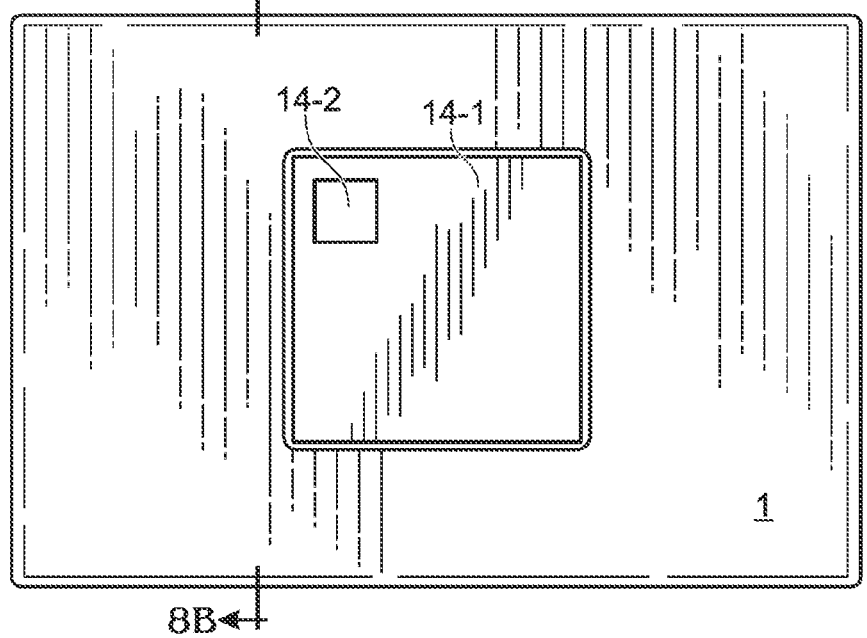

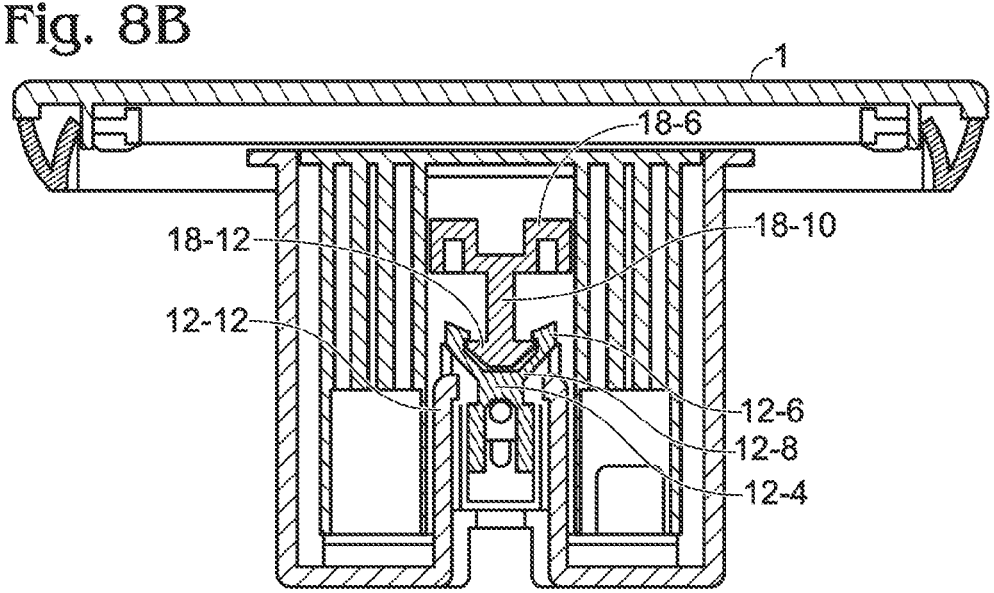
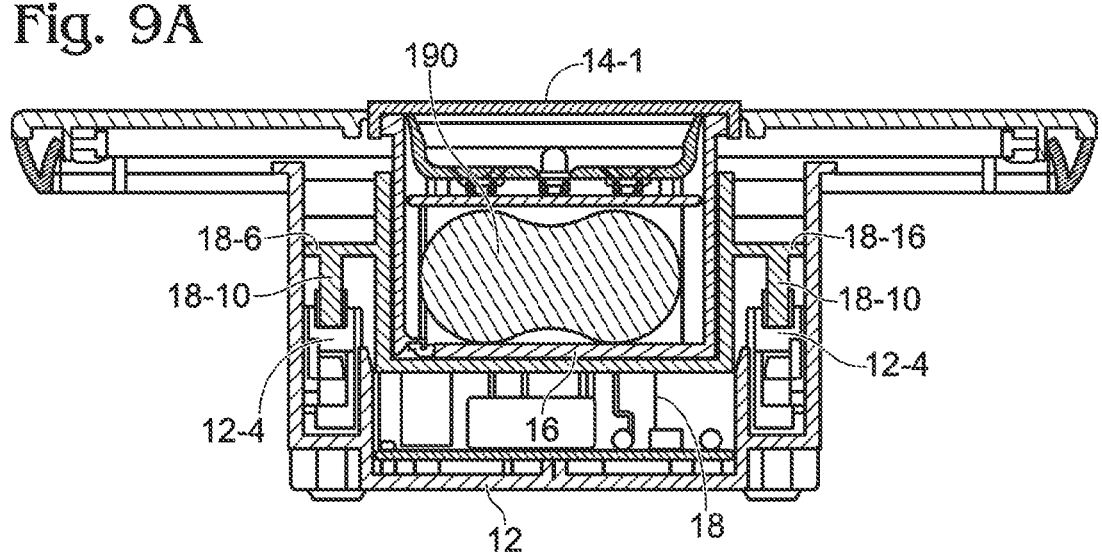

REMOVABLE NIGHT LIGHT

CROSS-REFERENCE TO RELATED APPLICATIONS

This is application is a continuation-in-part of U.S. patent application Ser. No. 13/680,675 filed on Nov. 19, 2012, the content of which is relied upon and incorporated herein by reference in its entirety, and the benefit of priority under 35 U.S.C. §120 is hereby claimed.

BACKGROUND OF THE INVENTION

1. Field of the Invention

The present invention relates generally to electrical wiring devices, and particularly to electrical wiring devices with removable night lights.

2. Technical Background

The typical layout of a room, whether it is in a public space, a living space or a commercial space, provides a wall light switch disposed adjacent to the point of entry. In a scenario that most people are familiar with, a person crossing the threshold of a darkened room will usually attempt to locate the wall switch and turn the wall switch to the ON position before entering. Sometimes the wall switch is not located in this position and the person seeking access to the room must search for the light switch. The person searching for the wall switch is required to navigate around objects such as tables and chairs. Usually, a person entering the room attempts to "feel" their way around the room. If an object is disposed relatively low to the floor surface the person may trip over it and suffer an injury.

Of course, there are situations where a light switch is not available, or is not readily available. There are other situations where the person entering the darkened room is disinclined to turn the lights ON as a matter of courtesy. Moreover, there are certain times that lighting is unavailable for the simple reason that there is an AC power outage. In this case, actuating a light switch is not an option even if the person entering the darkened room is inclined to turn the lights ON.

Consumers often insert a portable lighting device into an electrical receptacle located in the room and function as a temporary lighting device. While this arrangement may provide adequate illumination and temporarily mitigate a potentially unsafe condition, it has certain drawbacks associated with it. Temporary lighting devices are usually aesthetically unappealing and have a makeshift look and feel. Moreover, if the temporary lighting device is plugged into the receptacle for an extended period of time the lighting bill could be excessive over time. The user may attempt to address this problem by unplugging the temporary lighting device during daylight hours if the space admits natural light. However, once the temporary lighting device is unplugged from the receptacle there is the possibility that it will become lost, misplaced, or damaged from excessive handling. Of course, the steps of inserting and removing the device in response to the daily cycle is not a solution in internal spaces lacking access to sunlight. Finally, this approach offers no solution to a power outage issue.

A light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light element's life expectancy. Since this device is wired to the AC power source, this approach offers no solution to a power outage issue.

In yet another approach that has been considered, the aforementioned drawbacks are addressed by providing a "night light" that has a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. As such, conventional devices are typically arranged such that the lens covering the light element is disposed in one portion of the wiring device cover and the sensor element is disposed in a second portion of the cover, with sufficient space therebetween. If the wiring device includes another functional element such as a receptacle, the sensor may be disposed between the receptacle and the light's lens cover. Because the light sensor must be disposed a sufficient distance away from the light element, it necessarily requires that the lighting assembly be reduced in size to fit the wiring device form factor. Accordingly, conventional devices of this type often fail to provide an adequate amount of illumination for the intended application and, therefore, do not address the safety concern in a satisfactory manner. Moreover, since this device is wired to the AC power source, this approach offers no solution to a power outage issue.

What is needed is an electrical device configured to address the drawbacks and needs described above. In particular, a light emitting wiring device is needed that provides a sufficient amount of illumination when the ambient light in a given space falls below a safe level. The wiring device must maximize the effective area of illumination without sacrificing sensor isolation. What is also needed is an electrical wiring device that addresses the safety issues described above, while at the same time, providing user-accessible adjustment mechanisms with an eye toward energy efficiency. Finally, what is needed is a device that is operative and removable by the user when there is an AC power outage.

Turning now to another consideration, there are several drawbacks associated with conventional installation methods and conventional protective electrical wiring devices. Conventional protective electrical wiring devices often do not make efficient use of space. In addition, mounting the wiring device's ground strap to the device box is tedious, time consuming, and therefore costly. The same can be said of mounting the cover plate to the electrical wiring device. Moreover, in multi-gang installations, the finished look is often ragged because the plurality of electrical devices and their respective cover plates are typically not in alignment. This misalignment can be, and very often is, in all three dimensions. Retrofitting an electrical installation can also be problematic from the standpoint of the finished look because the device box, or an old work box, may not be precisely aligned to the plane of the wall surface. This is especially true if the wall surface itself is uneven. After remodeling a space, homeowners often seek to replace an existing wall plate with one that better matches the new décor. Thus, a homeowner may inadvisably remove the faceplate cover from an energized wiring device and inadvertently become exposed to a shock hazard from the "hot" electrical wiring.

What is needed, therefore, is an electromechanical switch mechanism that obviates the drawbacks articulated above. In particular, what is needed is an electromechanical switch that is substantially quiet and easy to operate, having a small angle of rotation between switch positions. A switch of this type is also needed that can be employed in a number of different form factors including one suitable for use in a modular framing system such that it does not require fasteners to be securely installed within the device box.

SUMMARY OF THE INVENTION

The present invention addresses the needs described above by providing an electrical device configured to address the drawbacks and needs described above. In particular, the present invention is directed to a light emitting wiring device that provides a sufficient amount of illumination when the ambient light in a given space falls below a safe level. The present invention maximizes the effective area of illumination without sacrificing sensor isolation. The electrical wiring device of the present invention also addresses the safety issues described above, while at the same time, providing user-accessible adjustment mechanisms that are energy efficient. Finally, the present invention is directed to a device that is operative and removable by the user when there is an AC power outage.

One aspect of the present invention is directed to an electrical device that includes a first assembly that has a first housing configured to be fixedly coupled to an installation element, the housing including a plurality of terminals configured to be coupled to an AC power source. An AC power handling circuit is disposed in the first housing and includes voltage output terminals, the AC power handling circuit being configured to derive a rectified voltage from the AC power source. A separator tray is slidably disposed in the first housing over the AC power handling circuit to thereby complete an enclosure of the power handling circuit within the first housing, the separator tray including voltage output terminals. A second assembly includes a second housing configured to be removably coupled to the separator tray, the second housing including input terminals configured to mate with the voltage output terminals. A lighting circuit is disposed in the second housing and coupled to the voltage output terminals. The lighting circuit includes a control circuit coupled to a plurality of first light elements and at least one second lighting element. The plurality of first light elements is configured to provide a relatively wide illumination beam when energized by the control circuit in a first operational state, and the at least one second lighting element being configured to provide a relatively narrow illumination beam when energized by the control circuit in a second operational state. The control circuit is configured such that the first operational state and second operational state do not simultaneously occur.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 5 is an exploded view of the lighting device depicted in FIGS. 3A-3B;

FIGS. 7A-7B are various views illustrating the illumination provided by the removable torch light portion of the lighting device depicted in FIGS. 3A-3B;

FIGS. 8A-8B are various views illustrating the push-release mechanism of the torch light of the present invention;

FIGS. 9A-9B are additional views illustrating the push-release mechanism of the torch light of the present invention;

DETAILED DESCRIPTION

Figure 1A:
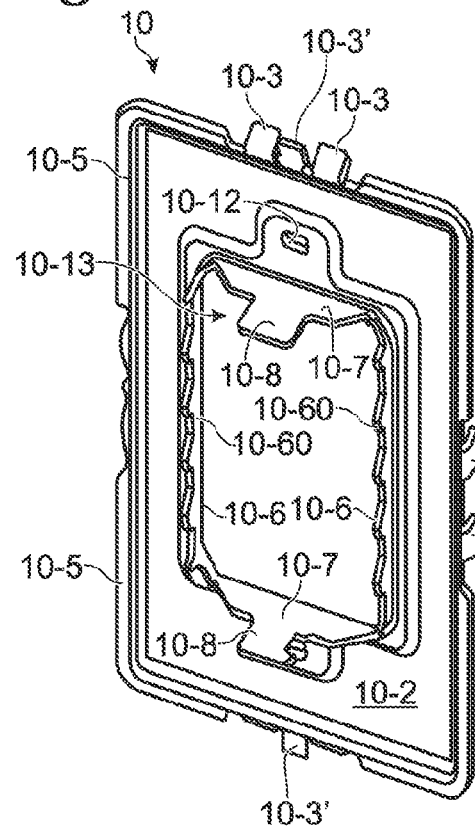
FIGS. 1A-1B are perspective views of a frame member in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the switch of the present invention is shown in FIG. 4, and is designated generally throughout by reference numeral 100.

Figure 1B:
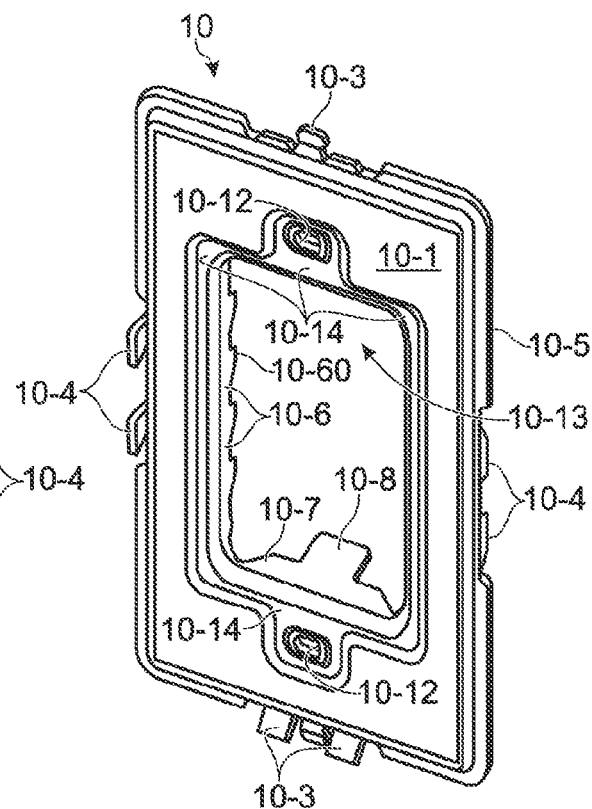

As embodied herein, and depicted in FIGS. 1A-1B, perspective views of a frame member 10 in accordance with the present invention are disclosed. FIG. 1A is directed to the rear side 10-2 of the frame member 10, whereas FIG. 1B is directed to the front side 10-1 of the frame member 10. The frame member 10 is configured to "complete the electrical enclosure" when one or more modular electrical devices (30, 40 or 50) and/or modular alignment connectors 20 are properly installed within the frame opening 10-13 such that the device wall box interior is substantially inaccessible. Stated differently, instead of using a conventional wall plate to complete the enclosure, the frame member 10 is used to prevent individuals from being shocked or electrocuted by concealing all electrical wiring under the frame 10 within the device wall box interior.

Thus, a frame enclosure lip 10-5 is disposed around the perimeter of the frame 10. The frame enclosure lip 10-5 is configured to substantially abut the wall surface (not shown in this view) such that a front edge of a properly installed wall box does not substantially touch the rear side 10-2 of the frame 10. This is true even when old work boxes are deployed. Old work boxes, of course, have flanges that are mounted to the outer surface of the wall surface 1. The frame enclosure lip 10-5 raises the rear surface 10-2 overtop the work box to avoid any interference with the flanges and prevent the frame 10 from contacting the wall surface 1.

As shown, the frame 10 includes a frame opening 10-13 that has an interior serrated edge or lip 10-6 that is configured to mate with the modular alignment conductors 20 and/or the electrical wiring devices 30, 40, 42 or 50 in the manner disclosed below. Once the electrical wiring device and/or the modular alignment connectors are installed within the frame opening 10-13, the enclosure is completed. The interior serrated lip 10-6 extends along lateral portions of the frame opening 10-13 to adjoin a connector landing element 10-7 disposed at either end of the frame opening 10-13. The interior serrated lips 10-6 and the connector landing elements 10-7 extend perpendicularly around the entire frame opening 10-12 to form a rim or skirt that is inserted inwardly within the device box interior during installation. Accordingly, the region under the rear frame surface 10-2 between the outer enclosure lip 10-5 and the interior rim (i.e., serrated lips 10-6 and landing 10-7) is disposed over the wall surface 1. Once the wall box fasteners 10-10 are inserted into the fastener slots 10-12 and tightened, the interior of the device box is accessed via the frame opening 10-13. After device installation, however, the frame opening 10-13 is completely occupied by some combination of modular wiring devices including switch 100 and/or modular alignment connectors 20 to thereby complete the enclosure. All of the wiring is under the frame assembly and cannot be accessed. Because the frame completes the overall enclosure, no wall plate need be employed by the present invention; the wall plate is replaced by an aesthetic overlay that can be removed at any time without exposing the homeowner to shock or electrocution. As its name suggests, the aesthetic overlay of the present invention may be comprised of a variety of decorator materials without regard to the structural considerations that are concomitant with completing the enclosure. Finally, because the frame of the present invention completes the overall enclosure, it may be employed with new construction, old construction or retrofits.

As embodied herein and depicted in FIGS. 2A-2D, perspective views of a modular alignment connector 20 in accordance with the present invention are disclosed. The modular alignment connector 20 is said to be modular because it adjusts and aligns the size of the frame opening such that various combinations of wiring devices such as lighting device 10, receptacles, dimmers and switches disposed in a variety of spatial orientations are used to complete the frame opening 10-13 when they are installed therein.

Figure 2A:
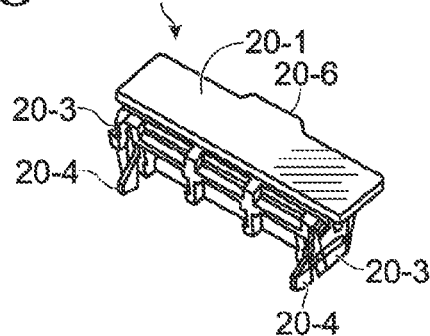
FIGS. 2A-2D are perspective views of a modular alignment connector in accordance with the present invention.

FIG. 2A shows a front major surface 20-1 of the modular alignment connector 20 (when it is inserted within the frame opening 10-13). The front major surface 20-1 of the modular alignment connector 20 has a width of approximately 11.2 mm and a length of about 45 mm. One pair of the alignment connectors 20 are the same size as a one-module electrical wiring device. The front major surface 20-1 includes a front connector flange 20-6 which is configured to fit within the frame connector seat 10-14 when the connector is inserted within the frame 10. The modular alignment connector 20 also includes bending snap arms 20-3 and spacer tangs 20-4 disposed on either side of the connector 20. A spacer channel 20-5 is disposed between the snap arm 20-3 and the spacer tang 20-4. As their name suggests, the snap arms 20-3 are used to "snap" the alignment connector 20 into the frame opening 10-13. Subsequently, the spacer tang 20-4 is pressed into the spacer channel 20-5 to lock the modular alignment connector 20 into the frame opening 10-13. The locked snap arms 20-3 retain the alignment connector 20 within the frame opening 10-13 thereafter. Stated differently, when a spacer tang 20-4 is inserted into a channel 20-5, the snap arm 20-3 can no longer deflect inwardly and thus cannot be removed from place. The snap connect assembly (20-3, 20-4, and 20-5) is configured to withstand at least 50 foot-pounds of pulling force.

Reference is made to U.S. patent application Ser. No. 13/680,675, which is incorporated herein by reference as though fully set forth in its entirety, for a more detailed explanation of the frame member 10.

Figure 2B:
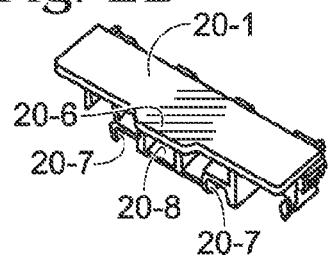

FIG. 2B shows the modular alignment connector 20 rotated 180° with respect to the view provided by FIG. 2A. The front stabilizing plate 20-6 and the rear connector flanges 20-7 form a connector channel 20-8 that is configured to grip the frame connector landing 10-7 (See FIGS. 1A-1B). The front stabilizing plate 20-6 is seated on the frame connector seat 10-14 when the alignment connector 20 is inserted into the frame opening 10-13. The purpose of the front stabilizing plate 20-6 is to help the connector 20 retain its position within the frame opening 10-13 by preventing it from being pushed inwardly and through frame opening 10-13.

Figure 2C:
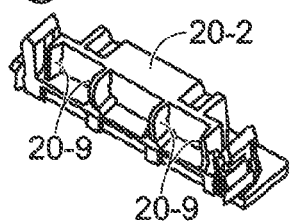

FIG. 2C is a rear view of the modular alignment connector 20. This view shows a rear major surface 20-2 that is supported underneath by device stop elements 20-9. Like the serrated stop elements 10-60 of the serrated lip 10-6, the device stop elements 20-9 are configured to engage and mate with the device snap elements formed in the modular wiring device housing (See elements 30-2, 40-2, etc., depicted in FIG. 5) to complete the electrical enclosure. This snap-fit arrangement fixes the modular wiring device (30-2, 40-2) within the opening 10-13 such that it cannot move laterally or longitudinally within the frame opening 10-13 when snapped in place. Stated differently, the interior serrated lips 10-6 and device stop elements 20-9 serve to secure and align the electrical wiring device (lighting device 10 and other electrical wiring devices) within the frame opening 10-13.

Figure 2D:
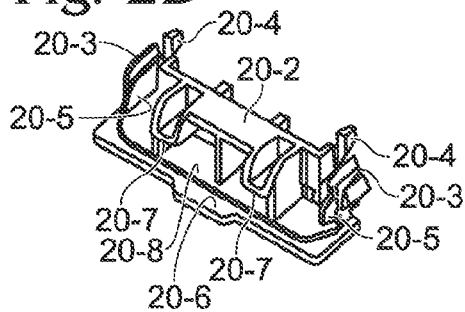

FIG. 2D shows the modular connector 20 rotated 180° with respect to the view provided by FIG. 2C. When inserted into the frame opening 10-13, the rear stabilizing plate 20-7 bears against edges of the connector landing 10-7 (See FIGS. 1A-1B). Again, the front stabilizing plate 20-6 and the rear stabilizing plate 20-7 form a channel 20-8 that restricts the movement of the modular alignment connector 20 after being seated on the connector seat 10-14. As the connector 20 is moved to this seated position, bending snap arms 20-3 are deflected inwardly by the interior serrated lip 10-6 until they clear and snap back outwardly into the serrations. Again, the bending snap arms 20-3 prevent the connector 20 from sliding or moving out of its seated position.

Reference is made to U.S. patent application Ser. No. 13/680,675, which is incorporated herein by reference as though fully set forth in its entirety, for a more detailed explanation of the modular alignment connector 20.

Figure 3A:
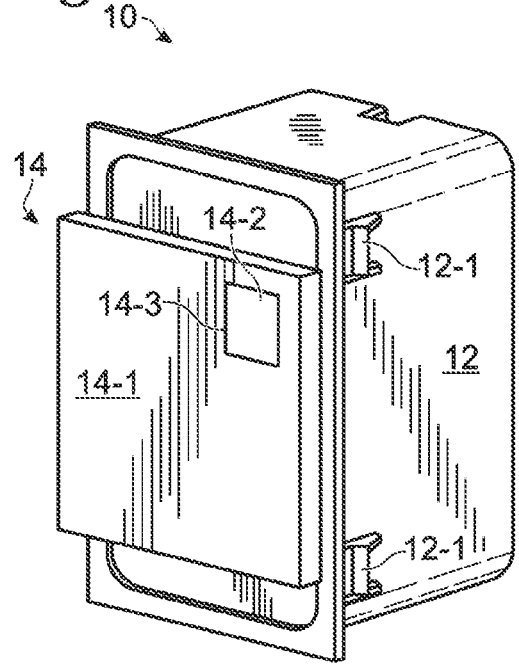
FIGS. 3A-3B are perspective views of a lighting device in accordance with one embodiment of the present invention.
Figure 3B:
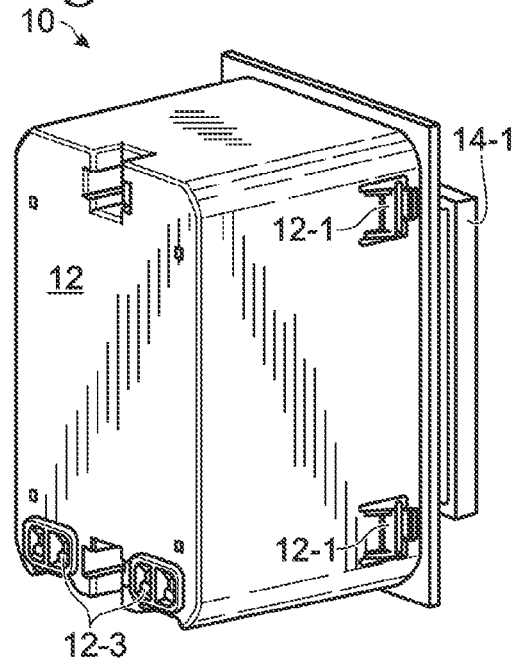

As embodied herein and depicted in FIGS. 3A-3B, perspective views of a lighting device 10 in accordance with one embodiment of the present invention are disclosed. The device 10 includes a front cover 14 that includes a switch portion 14-1 disposed within an opening 14-3 disposed in the front lens 14-2. The switch 14-1 and the lens 14-2 are formed from the same material and the switch 14-1 is substantially flush with respect to the lens 14-2. The dotted line indicates that the switch 14-1 and the lens 14-2 are so closely matched in appearance that it is difficult to distinguish the two elements without a close inspection thereof. The front cover 14 is coupled to the back body 12. The back body 12 includes snap elements 12-1 that are configured to mate with the frame 100 and the modular connectors 200 shown in FIGS. 1-2.

FIG. 3B is a rear perspective view of the device 10 and further shows a plurality of AC terminals 12-3 used to connect the AC power handling circuitry in back body 12 to an AC power source.

Figure 4A:
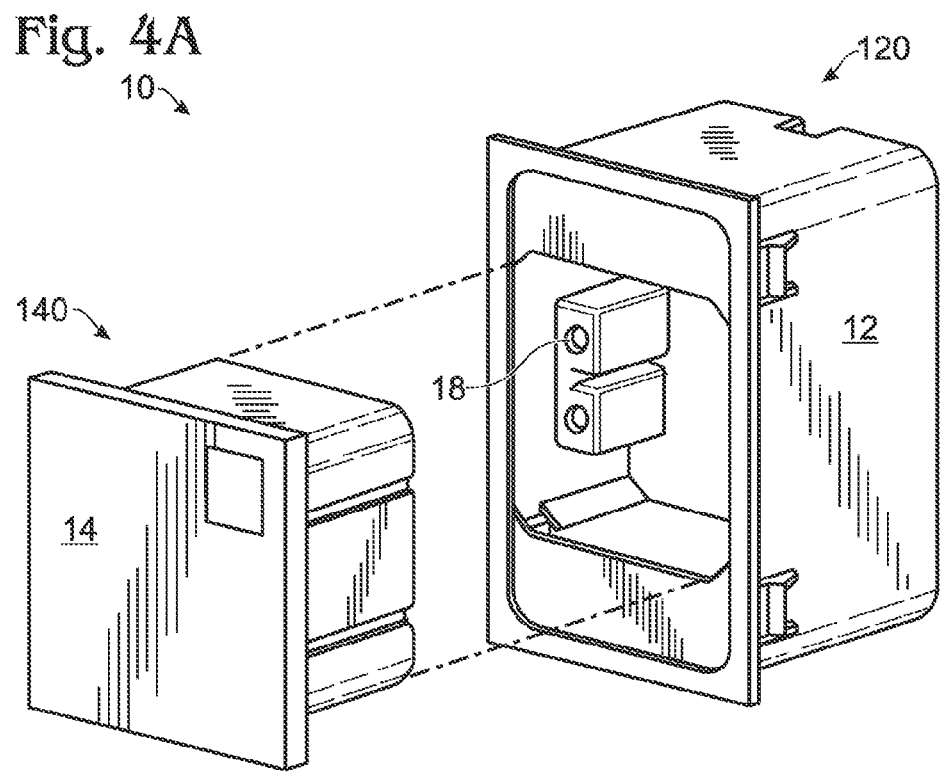
FIG. 4A-4B perspective views of the lighting device depicted in FIGS. 3A-3B with the torch light removed.
Figure 4B:
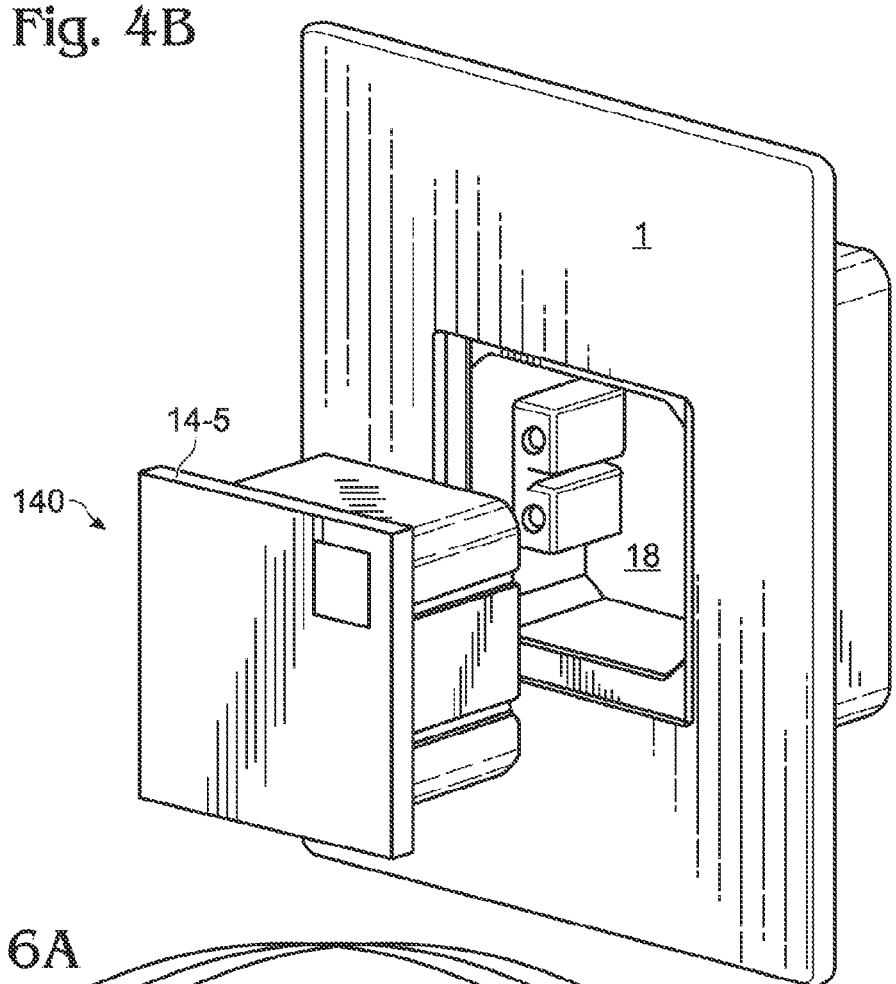

Referring to FIG. 4A-4B, perspective views of the lighting device 10 with the torch light assembly 140 removed are disclosed. In FIG. 4A, the device 10 is shown to include a removable torch assembly 140 that is configured to be inserted and removed from a back body assembly 120. Stated differently, the back body assembly 120 is installed within the frame 100 and connected to the electrical distribution system via terminals 12-3 (See FIG. 3B). In FIG. 4B, the back body assembly 120 is shown installed and covered by an aesthetic plate 1. The torch assembly 140 is shown removed therefrom.

Referring to FIG. 5, an exploded view of the lighting device 10 depicted in FIGS. 3A-3B is disclosed. Again, the device 10 includes a torch assembly 140 and a back body assembly 120. The back body assembly 120 includes push release mechanisms 12-4 that alternately hold the torch assembly 140 within the back body 12 and release the torch 140 therefrom. An AC power handling printed circuit board assembly (PCB) 20 is also disposed in the back body 12. PCB 20 includes power supply jacks 20-1 that are configured to be inserted into the jacks 18-4 formed in the back body tray 18. PCB 20 also includes terminal hardware 20-2, which is accessible via the terminal openings 12-3 (See FIG. 3B). The tray member 18 also accommodates slide stop elements 18-2 which are disposed either side of tray 18 as shown. The slide stops 18-2 snap into the back body 12 and serve to restrict the travel of tray 18 between two positions governed by release mechanism 12-4. The slide stops 18-2 also provide a snug fit for the two-module torch assembly 140 yet allow the torch 140 to be completely removed from the tray or reinserted into the tray. On the other hand, the slide stops 18-2 are not removable from either the tray or the back body 12. When tray 18 and slide stops 18-2 are installed, no live wires or parts associated with PCB 20 are accessible to the consumer even when torch 120 is removed from tray 18.

Turning now to the torch assembly 140, it includes a torch body 16 that insertable into the tray 18 between the stop slides 18-2. The torch body includes a battery door 16-1 that is used to remove/insert the battery 190 as needed. The torch body 16 also includes a separator floor 16-2 that divides the torch body 16 into a lower battery compartment and an upper region for the low power PCB 180. The low power PCB 180 is coupled to the LED reflector body 14-4. Thus, the various LEDs mounted on the PCB 180 (as described in greater detail below) are inserted into openings 14-6 in the reflector 14-4 such that the emitted light is directed outward toward the lens cover 14-1. Finally, the switch actuator 14-2 is disposed in the top right hand corner of the lens cover opening 14-3 and is in alignment with the push-button switch S1 disposed on PCB 180. An edge of switch actuator 14-2 rests against a rim portion 16-6 of torch body 16, around which it pivots. An arm on the rear side of switch actuator 14-2 (not shown) is operatively coupled to switch S1.

When torch assembly 140 is inserted into tray 18, electrical pins 180-2 disposed on the rear side of PCB 180 (not shown) insert through jack openings 18-4 to make electrical contact with supply jacks 20-1. As the torch assembly 140 is inserted, tray 18 is driven inwardly until release mechanism 12-4 assumes the installed position. Of course, PCB 20 and PCB 180 become electrically interconnected. When torch assembly 140 is in the installed position, front lens 14-2 is substantially flush with aesthetic wall plate 1.

When the user wants to use torch assembly 140 as a remote flashlight, first the user applies pressure to the front lens 14-2, driving the torch assembly 140 (along with tray 18) behind the surface of the aesthetic wall plate 1 against spring bias from the release mechanism 12-4. The release mechanism reaches a position where it stops opposing the applied pressure and instead exerts an outward force on tray 18. When the user stops applying the pressure, this outward force is sufficient to at least partially disconnect pins 180-2 from supply jacks 20-1. Release mechanism 12-4 assumes a "release length" whereupon front lens 14-2 extends outwardly from the aesthetic wall plate 1 exposing edges 14-5 of front lens 14-2. Then the user grips the edges 14-5 of front lens 14-2 to separate torch 140 for remote use as a flashlight. When the flashlight is no longer needed, torch assembly 140 is reinstalled in tray 18 in the manner that has been described.

Figure 6A:
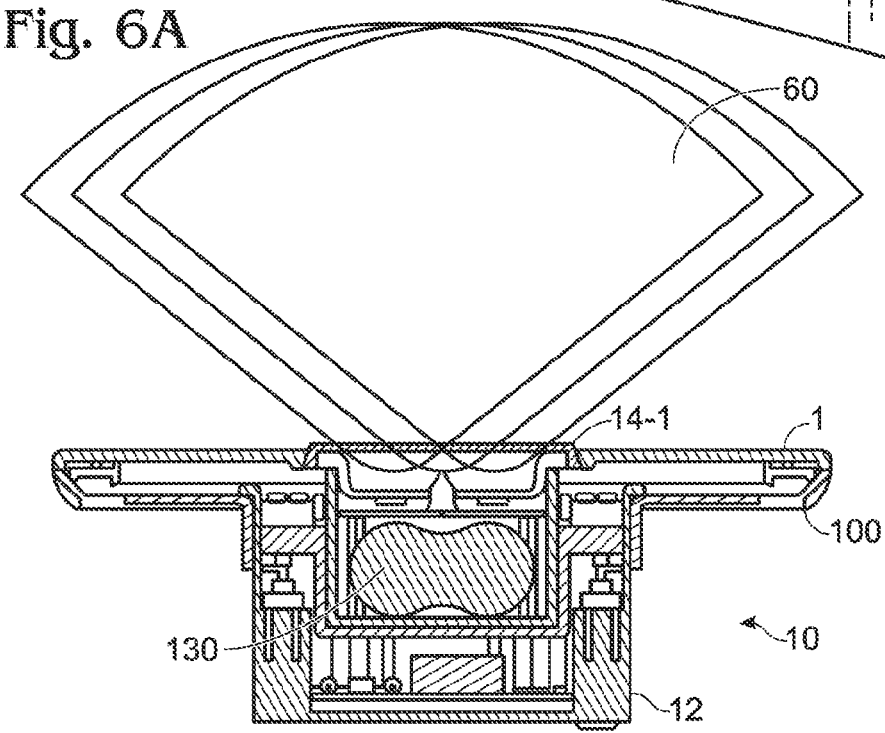
FIGS. 6A-6B are various views illustrating the illumination provided by the night light portion of the lighting device depicted in FIGS. 3A-3B.
Figure 6B:
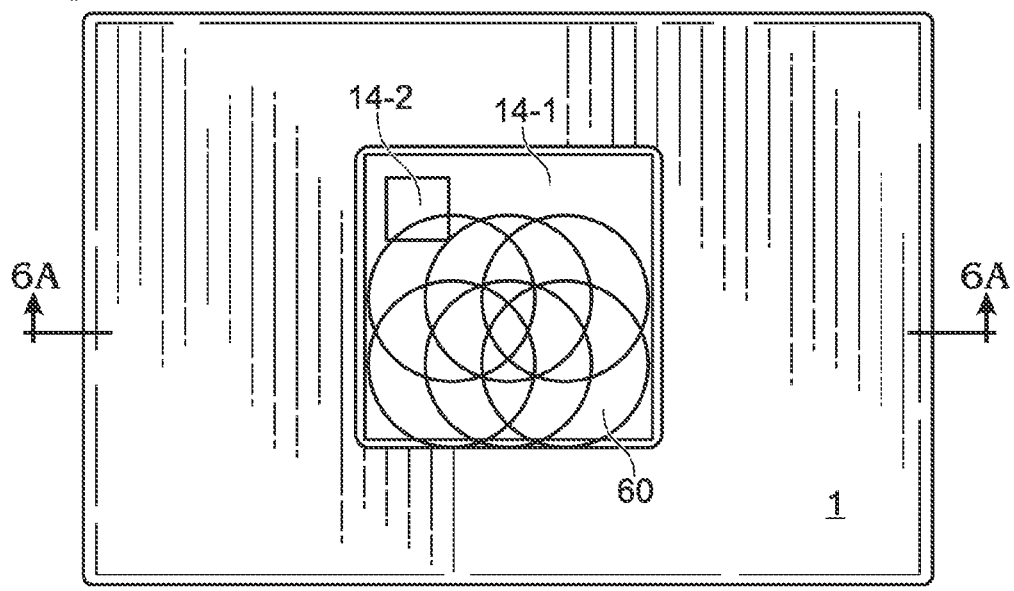

Referring to FIGS. 6A-6B, various views illustrating the illumination provided by lighting device 10 when operated as a nightlight. In particular, there are six night light LEDs (L1-L6.) FIG. 6A is a sectional view of the device 10. The night LEDs (L1-L6) are shown to direct a relatively wide illumination beam pattern 60 through the cover lens 14-1. The LEDs (L1-L6) each are configured to provide a 120° illumination beam. FIG. 6B is a frontal view of device 10 and shows the emitted light contribution for each LED at the lens 14-1 interface. Comparing FIGS. 6A-6B it becomes clear that the emitted beam pattern for LEDs (L1-L6) is not especially focused, but rather is configured to direct a widely diffused light pattern into the ambient environment. Torch assembly 140 can be operated as a nightlight when used as a flashlight or when installed in tray 18.

Figure 7A:
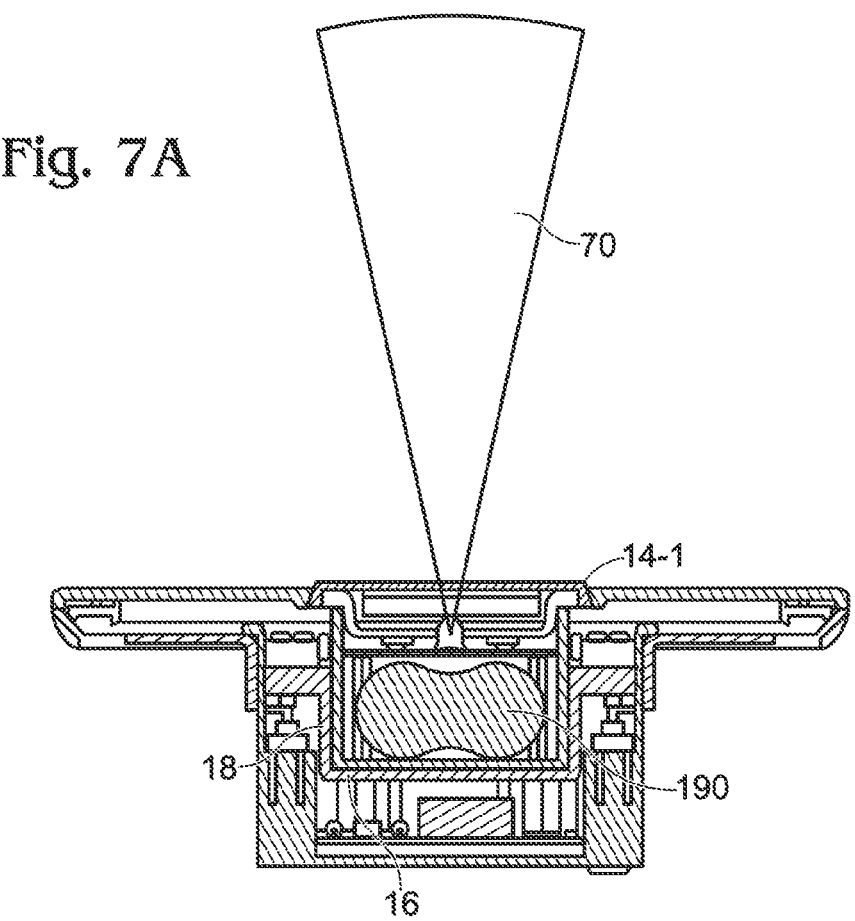

Referring to FIGS. 7A-7B, various views illustrating the illumination provided by lighting device 10 when operated as a torch light. Note that there is only one torch light LED (L7) in this embodiment. LED (L7) is configured to provide about a 30° illumination beam. FIG. 7A is another sectional view that illustrates the rather thin nature of the light emitted from the torch LED (L7). FIG. 7B is a frontal view of device 10 and shows the emitted light contribution for LED L7 at the lens 14-1 interface, namely, it is pencil thin when it is incident the lens 14-1 and thus directs a focused beam that is more suitable for use as a flashlight. In one embodiment LED (L7) can be activated only when torch assembly 140 is removed from tray 18, i.e., when power is not being provided by PCB 20 to PCB 180. In another embodiment, LED (L7) can be activated even when the torch assembly is installed in tray 18.

Referring to FIGS. 8A-8B, various views illustrating the push-release mechanism 12-4 of the present invention are disclosed. FIG. 8A provides a sectional line A-A that bisects the device assembly 10 through the aesthetic cover, the upper slide stop 18-2, and the back body 12. FIG. 8B is the corresponding sectional view. Referring to FIG. 5 and FIG. 8B, tray 18 has arms 18-6 that extend beneath slide stops 18-2. The outward travel of the tray 18 is stopped when arms 18-6 reach the ends of slide stop channels 18-8. Thus arms 18-6 restrict the outward position of tray 18 once slide stops 18-2 are installed. On the other hand, arms 18-6 are free to travel inwardly inside slide stop channels 18-8 until release mechanism 12-4 is fully compressed.

In FIG. 8B, arm 18-6 is shown to have a pin portion 18-10 that has a locking portion 18-12 at the end thereof. A cantilevered structure 12-8 having hooked fingers 12-6 is attached to the release mechanism 12-4. Cantilevers 12-8 are pre-biased away from pin portion 18-10. When slide stops 18-2 are installed alongside tray 18, they bear down on a corresponding arms 18-6 to drive tray 18 inwardly and the locking portion 18-12 slides between hooked fingers 12-6. Eventually, locking portion 18-12 touches release mechanism 12-4 which in turn drives cantilevered structure 12-8 inwardly.

Cantilevers 12-8 enter a pocket 12-12 formed in back body 12 which forces them toward each other. Once the slide stop 18-2 is snapped into back body 12 in the installed position, the cantilevers 12-8 can never escape the pocket and flair outwardly such that the locking portion 18-12 is above the hooked fingers 12-6. Thus, the tray 18 is fully under the control of release mechanism 12-4 and the hooked fingers 12-6 hold the locking portion 18-12 against release mechanism 12-4. Since the length of release mechanism 12-4 is bi-stable, the position of tray 18 is bi-stable as well. The tray 18 and the torch light assembly 140 are installed in a position whereby the lens 14-1 of the torch light assembly is substantially flush with aesthetic wall plate 1. When the tray is removed, the lens 14-1 projects outwardly from the aesthetic wall plate.

Figure 9B:
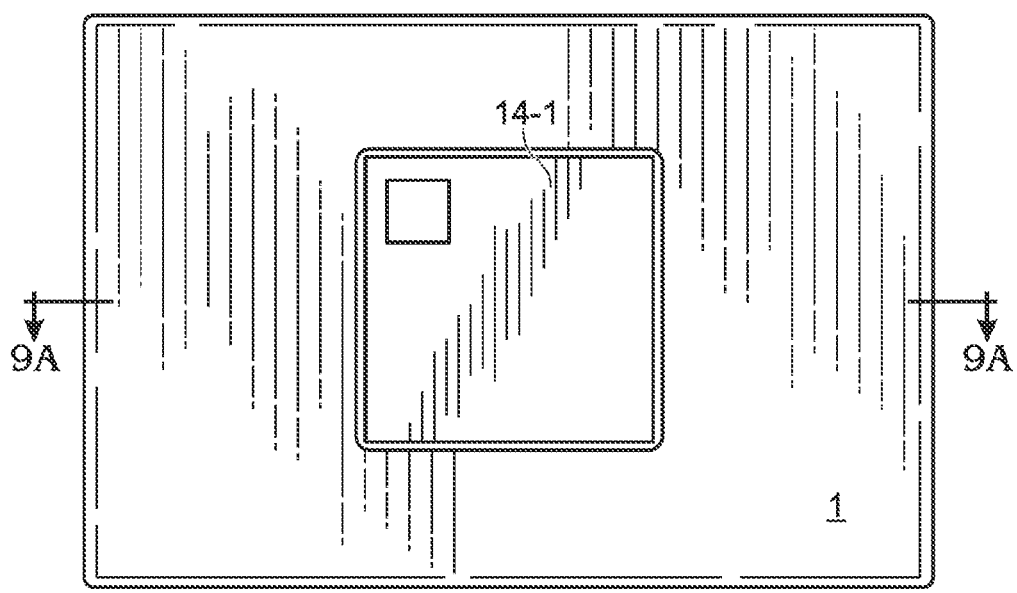

Referring to FIGS. 9A-9B, additional views illustrating the push-release mechanism 12-4 of the present invention are disclosed. FIG. 9A provides a sectional line B-B that bisects the device assembly 10 through the aesthetic cover, slide stops 18-2, and the back body 12. FIG. 9B is the corresponding sectional view. This angle shows tray 18 retaining the flash light assembly 140 within the back body assembly 120.

Figure 10A:
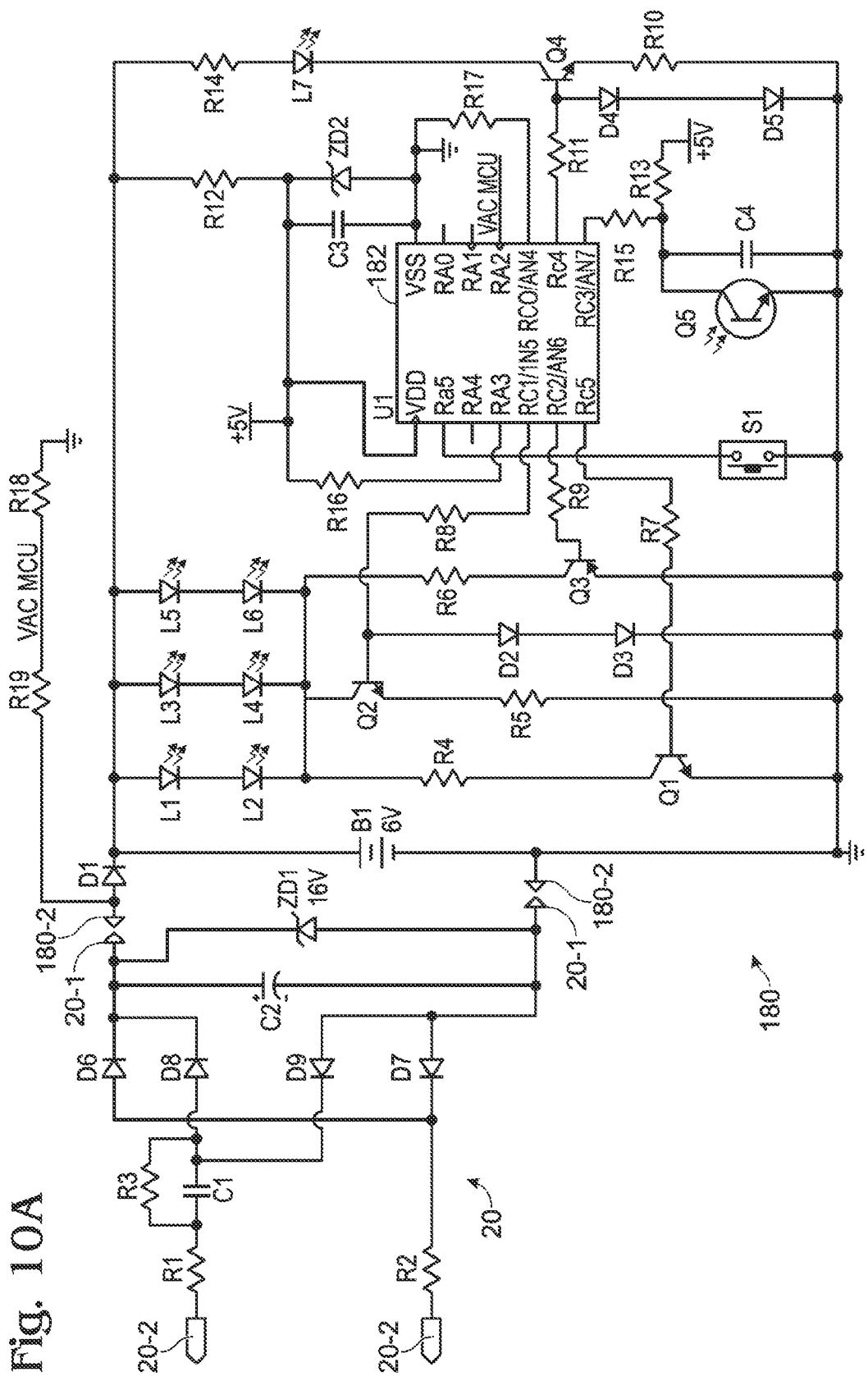
FIGS. 10A-10B are schematic diagrams of the lighting device depicted in FIGS. 3A-3B.
Figure 10B:
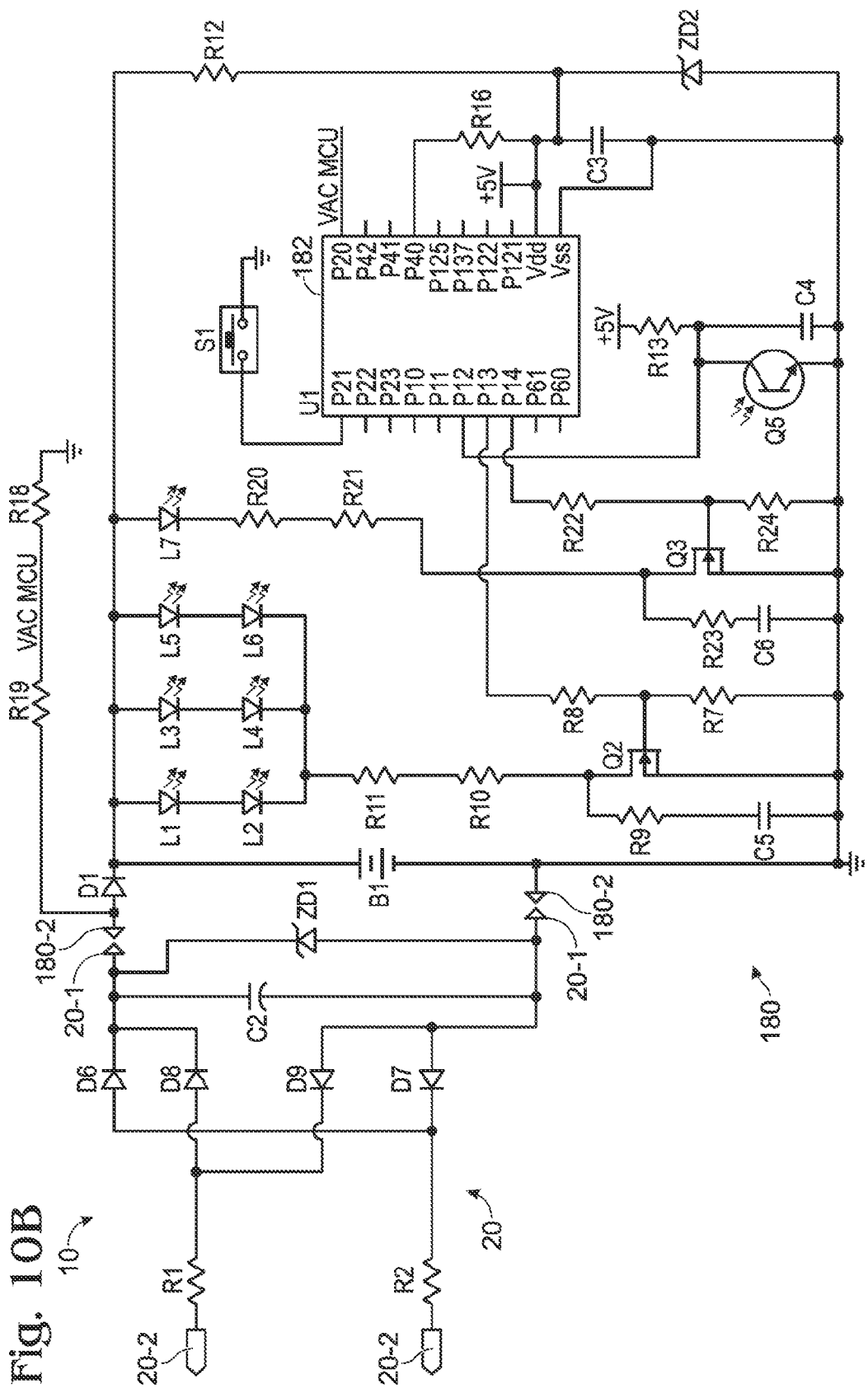

As embodied herein and depicted in FIGS. 10A-B, schematic diagrams of the lighting device 10 depicted in FIGS. 3A-3B are disclosed. Referring to FIG. 10A, The AC power handling PCB 20 is shown on the left side of the schematic. The line hot terminal is coupled to a charging filter comprising resistors R1 and R3 and capacitor C1. Both the hot and neutral line terminals (L Wire, N Wire) are coupled to a full wave rectifier bridge (D6-D9) that provides a DC voltage signal to the low power PCB 180 that drives the LEDs. The low power PCB 180 is shown to the right side of the schematic and is interconnected to PCB 20 by way of supply jacks 20-1 and electrical pins 180-2. The output of the rectifier bridge (D6-D9) is coupled to a diode D1 that is configured to prevent the +15V DC rail of the low power PCB 180 from being directed back out to the 120 VAC power source that is connected to the terminals (L Wire, N Wire).

PCB 180 includes an integrated control circuit 182 that works in conjunction with the switch S1 (actuated by 14-2) and the light sensor Q5. The light sensor Q5 is connected to the controller 182 via a 10K resistor R5 and is used by Q5 to turn the switch ON and OFF in accordance with hysteresis program memory E²ROM. The controller 182 is programmed to observe two different ambient light thresholds (T1, T2). One can imagine that this cycle is controlled by the alternating phases of the day and night cycle. Thus, when night approaches, the ambient light is declining and it reaches the lower threshold T1, and the controller 182 turns the LEDs (L1-L6) ON (at a level that is controlled by the switch S1) until the ambient light begins to increase again, i.e., at daybreak. As the ambient light is increasing, it will pass the lower threshold T1 and the LEDs will remain ON. It is not until the ambient light reaches the higher threshold T2 that the controller 182 turns the LEDs OFF. In one embodiment of the present invention, the controller 182 is programmed to delay the extinguishing of the LED light by four seconds after the second threshold. During the four second time frame, the lights fade until they are completely extinguished. LEDs (L1-L6) are in a series/parallel arrangement to make best use of the 5 VDC supply.

The switch S1 is coupled to the controller 182 and is configured to select the light level of the LEDs (L1-L6) from OFF, LOW, MEDIUM or HIGH settings. In the low setting, pin 5 of the controller 182 turns ON transistor Q1. The emitter of Q1 is connected to a 10 KOhm resistor R4 which limits the current passing through the LEDs such that they are emit a low level of illumination. When the user depresses switch S1 again, the controller turns pin 80N while turning pin 5 OFF. Thus, transistor Q3 is turned ON. In this case, a smaller current limiting resistor R6 (3.9K Ohms) is connected to the emitter of Q3; this allows more current to flow through the LEDs (L1-L6). Another depression of switch S1 turns transistor Q2 ON, and Q3 OFF. The emitter of Q2 has no current limiter connected thereto, and thus, the LEDs shine at their brightest level.

The fifth switch setting turns all of the LEDs (L1-L6) OFF and turns the torch LED L7 ON. This setting is designed to be employed when the user removes the flashlight portion 140 from the back body portion. Obviously, when this occurs, the low power circuit 180 is operating on battery power from B1.

Light sensor Q5 turns off LEDs (L1-L7) when there is a bright ambient lighting condition. In order to make it possible for the user to change the night light setting even at those times, when the user depresses switch S1, processor 182 momentarily ignores the signal from light sensor Q5 for a predetermined period of time. This allows the nightlight LEDs (L1-L7) to turn on during that period so the user can advance S1 through the OFF, LOW, MEDIUM and HIGH and/or TORCH positions to select the desired setting. Processor 182 is configured to turn OFF LEDs (L1-L7) periodically, each time to short to notice, when it interrogates light sensor Q5. Thus the LEDs do not give false indication of the true ambient lighting condition.

In an embodiment of the invention, low voltage circuit 180 is configured to recognize whether flash light assembly 140 is coupled to and receiving power from the back body assembly 120. When power is being received, the VAC MCU input of processor 182 recognizes that fact via a voltage signal from resistor R19 connected between rectifier bridge (D6-D9) and diode D1. When power is being received, VAC MCU is HIGH. When power is not being received such as when flash light assembly 140 is removed from assembly 120 and being operated as a flash light, VAC MCU is LOW. Processor 182 can use this information in accordance with one or more of the following non-limiting illustrations: Processor 182 prevents torch LED L7 from turning on when the VAC MCU input is HIGH (the processor will skip the fifth switch setting.) The processor prevents the night light LEDs (L1-L6) from turning on when the VAC MCU input is LOW (the processor skips the second through fourth settings.) The processor de-activates all but the second switch setting when the VAC MCU input is LOW, to conserve the battery. The processor activates an LED when VAC MCU is LOW, as a power loss indicator. In another embodiment of the invention, the processor may be configured to detect a low voltage condition at diode ZD2. When that happens, processor 182 limits the LED illumination so as to conserve the battery.

As described above, transistors Q1-Q3 allow the night light intensity to be changed as step increases, LOW-MEDIUM-HIGH. In another embodiment of the invention a step increase takes place each time switch S1 is tapped. However, if switch S1 is held for a predetermined period of time, processor S1 enters a sweep mode in which the night light LEDs (L1-L6) vary smoothly from off to the brightest light intensity in a recurring pattern. When S1 is released, the intensity at that moment is held by processor 182 in memory.

Referring to FIG. 10B an alternate schematic diagram of the lighting device 10 depicted in FIGS. 3A-3B is disclosed. The operation of this circuit is similar to FIG. 10A except a single semiconducting device (FET Q2) controls the nightlight LEDs (L1-L6) instead of three separate transistors. FET Q2 is driven by pin 13 of processor 182. Processor 182 dims nightlight LEDs (L1-L6) using pulse width modulation (PWM.) In one embodiment, processor 182 provides a modulated 1 kHz square wave at pin 13. LEDs (L1-L6) reach full brightness when the duty cycle of the square wave is at 100%. By way of non-limiting example, Switch S1 is tapped to step the duty cycle through OFF-LOW-MEDIUM or HIGH brightness. Alternatively, S1 is tapped to start the duty cycle sweeping through off to maximum brightness and tapped again when the desired brightness is achieved. Alternatively, S1 is single-tapped to step the duty cycle and held steadily to sweep the duty cycle. Alternatively, S1 is tapped to turn the LEDs on and off and held steadily to change the brightness either in a stepped or a swept manner.

Figure 11A:
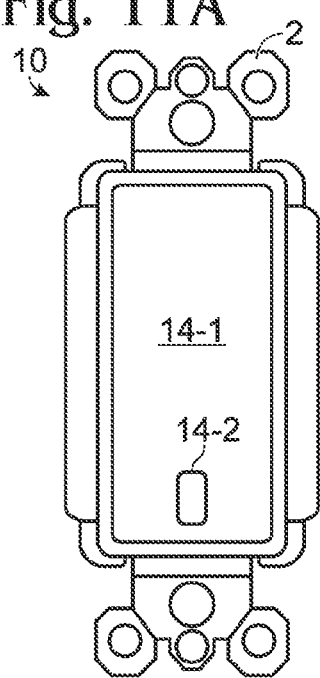
FIGS. 11A-11B are various view of a lighting device in accordance with another embodiment of the present invention.
Figure 11B:
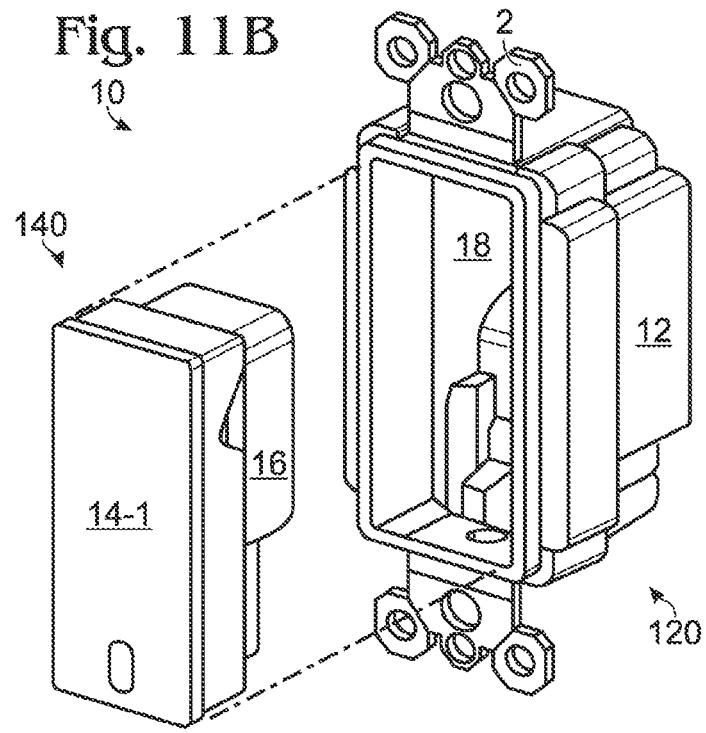

Referring to FIGS. 11A-11B, various view of a lighting device 10 in accordance with another embodiment of the present invention is disclosed. FIG. 11A is a front view of the lighting device adapted for use in a conventional wiring arrangement (i.e., without the frame) that connects the device to a device box using the mounting ears 2. The same reference numbers are used here to refer to the same or like parts described previously. Thus, in FIG. 11B, the removable flash light 140 is shown detached from the back body assembly 120. As before, the back body tray 18 completes the enclosure such that no line wires or parts are accessible to the consumer when the flash light 140 is removed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical device comprising:
a first assembly including,
a first housing configured to be fixedly coupled to an installation element, the housing including a plurality of terminals configured to be coupled to an AC power source,
an AC power handling circuit disposed in the first housing including voltage output terminals, the AC power handling circuit being configured to derive a rectified voltage from the AC power source, and
a separator tray slidably disposed in the first housing over the AC power handling circuit to thereby complete an enclosure of the power handling circuit within the first housing, the separator tray including voltage output terminals; and
a second assembly including,
a second housing configured to be removably coupled to the separator tray, the second housing including input terminals configured to mate with the voltage output terminals,
a lighting circuit disposed in the second housing and coupled to the voltage output terminals, the lighting circuit including a control circuit coupled to a plurality of first light elements and at least one second lighting element, the plurality of first light elements being configured to provide a relatively wide illumination beam when energized by the control circuit in a first operational state, and the at least one second lighting element being configured to provide a relatively narrow illumination beam when energized by the control circuit in a second operational state, the control circuit being configured such that the first operational state and second operational state do not simultaneously occur.

2. The device of claim 1, wherein the second assembly further comprises a cover portion coupled to the second housing, the cover portion including a lens element configured to direct the relatively wide illumination beam and the relatively narrow illumination beam into an ambient environment during their respective operational states.

3. The device of claim 2, wherein the lens element covers substantially all of a front facet of the second assembly.

4. The device of claim 3, wherein the cover portion includes a switch actuator disposed in the lens element, the cover portion and the lens element being substantially flush and formed from an identical material.

5. The device of claim 3, wherein the lighting circuit includes a switch operatively coupled to the switch actuator.

6. The device of claim 1, wherein the lighting circuit includes a switch coupled to the control circuit, the switch being configured to provide the control circuit with a command signal operative to control the illumination levels of the plurality of first light elements.

7. The device of claim 6, wherein the switch is configured to provide the control circuit with a command signal operative to switch the operational state between the first operational state and the second operational state.

8. The device of claim 1, wherein the control circuit is configured to disable the second operational state when the second assembly is coupled to the separator tray.

9. The device of claim 1, wherein the control circuit is configured to disable the first operational state when the second assembly is decoupled from the separator tray.

10. The device of claim 1, wherein the lighting circuit is configured to be operative in at least the second state when the second assembly is completely separated from the first assembly.

11. The device of claim 10, wherein the lighting circuit includes an electrical storage element that is configured to energize the lighting circuit when the second assembly is being hand held.

12. The device of claim 1, wherein the lighting circuit includes a battery, the lighting circuit being configured to automatically derive power from the battery when the second assembly is decoupled from the separator tray.

13. The device of claim 1, wherein the second assembly includes a separator portion that divides the second housing into a first compartment and a second compartment.

14. The device of claim 13 wherein the first compartment includes the lighting circuit, and the second compartment includes a power handling arrangement.

15. The device of claim 13, wherein the lighting circuit is coupled to a light emitting assembly.

16. The device of claim 15 wherein the light emitting assembly comprises: a reflector portion configured to accommodate the plurality of first light elements and the at least one second lighting element; and a cover assembly including a planar lens cover coupled to the second housing.

17. The device of claim 13, wherein the power handling arrangement includes the input terminals and an electrical storage element.

18. The device of claim 1, wherein the first housing includes a back body portion and at least one latching arrangement configured to fasten to the back body, the at least one latching arrangement being configured to limit the slidable motion of the separator tray inside the first housing.

19. The device of claim 18, wherein the at least one latching arrangement includes a push-release mechanism that is latched to the separator tray, the push-release mechanism being configured to hold the separator tray in either of two predetermined positions inside the first housing.

20. The device of claim 19, wherein when the separator tray is in one of the predetermined positions, a lens portion of the second housing when coupled to the separator tray is substantially flush with a device wall plate.

21. The device of claim 20, wherein when the separator tray is in the other predetermined position, the lens portion of the second housing when coupled to the separator tray extends outwardly from the device wall plate to let the user remove the second assembly from the first assembly.

22. The device of claim 18, wherein when the separator tray is in one of the predetermined positions, a lens portion of the second housing when coupled to the separator tray extends outwardly from the device wall plate to let a user remove the second assembly from the first assembly.

23. The device of claim 1, wherein the separator tray is slidably coupled to a back body portion of the first housing by way of at least one push-release mechanism.

24. The device of claim 23, wherein the at least one push-release mechanism is operatively coupled to the separator tray to effect an installed position or a removable position of the second assembly with respect to the first assembly.

25. The device of claim 1, wherein the lighting circuit includes a switch and an ambient light sensor coupled to the control circuit, the switch being configured to provide the control circuit with a command signal operative to the control the illumination levels of the plurality of first light elements and the ambient sensor being configured to provide the control circuit with ambient light data.

26. The device of claim 25, wherein the ambient light data is used by the control circuit to turn the plurality of first light elements ON when the ambient light is less than or equal to a first threshold and turn the plurality of first light elements OFF when the ambient light is greater than or equal to a second threshold.

27. The device of claim 26, wherein the first threshold and the second threshold correspond to different ambient light levels.

28. The device of claim 27, wherein the second threshold is greater than the first threshold.

29. The device of claim 27, wherein the control circuit is configured to drive the plurality of first light elements to fade over a predetermined period of time to transition from ON to OFF.

30. The device of claim 1, further including a user accessible switch at least partially disposed in the first housing, wherein the control circuit is configured to dim the plurality of first light elements in a stepped sequence or a swept sequence in response to user actuation of the switch.

31. A system including the electrical device of claim 1, the system comprising: a frame configured to be mounted to a device wall box, the frame including a first edge formed around a peripheral portion of the frame, the first edge being configured to abut a structural surface disposed around the device wall box, the frame assembly further including a frame opening corresponding to at least one gang opening, the frame opening substantially defining a second edge configured to extend inwardly toward the device wall box interior such that the frame opening provides sole access to the device wall box interior; and the electrical device of claim 1, the first housing being configured to be coupled within the frame opening to complete the system enclosure such that the device wall box interior is substantially inaccessible.

32. The system of claim 31, further comprising an aesthetic overlay configured to be removably coupled to the frame assembly, the aesthetic overlay including an overlay opening configured to provide access to at least a portion of the cover assembly.

33. The device of claim 1, further comprising a ground strap including external mounting elements disposed at either end thereof, the ground strap being configured to couple the first housing to a device box.

* * * * *